Figure 1:
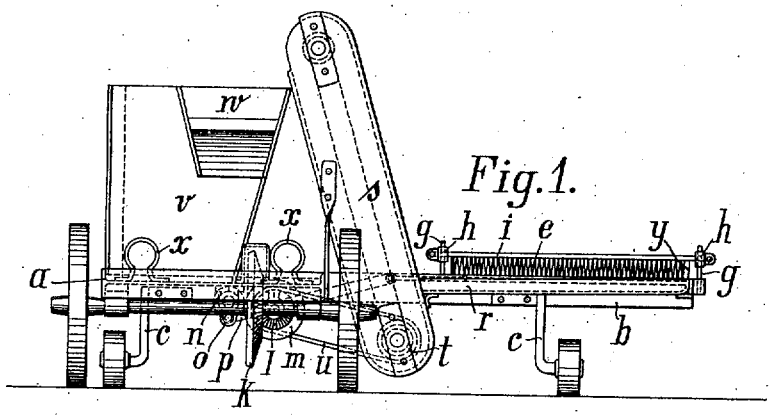

No. 853,343.  
PATENTED MAY 14, 1907.

L. CHRIST & A. MEGNER.  
HARVESTING MACHINE.  
APPLICATION FILED OCT. 9, 1905.

2 SHEETS—SHEET 1.

Witnesses

Inventors  
Ludwig Christ and A. Megner  
per  
Attorney

No. 853,343. PATENTED MAY 14, 1907.
L. CHRIST & A. MEGNER.
HARVESTING MACHINE.
APPLICATION FILED OCT. 9, 1905.

2 SHEETS—SHEET 2.

Witnesses
Stanley Wood.
Robert Anne Hughes.

Inventors
Ludwig Christ
Alois Megner.
By W. Evand.
Attorney.

UNITED STATES PATENT OFFICE.

LUDWIG CHRIST AND ALOIS MEGNER, OF MERCHINGEN, NEAR OSTERBURKEN, GERMANY.

HARVESTING-MACHINE.

No. 853,343.   Specification of Letters Patent.   Patented May 14, 1907.

Application filed October 9, 1905. Serial No. 282,075.

*To all whom it may concern:*

Be it known that we, LUDWIG CHRIST and ALOIS MEGNER, subjects of the German Emperor, residing at Merchingen, near Osterburken, Grand Duchy of Baden, in the Empire of Germany, have invented certain new and useful Improvements Relating to Harvesting-Machines, of which the following is a specification.

This invention relates to a machine for cutting the heads of corn in the field. Its essential novelty consists in the construction of the cutting device. The latter is composed of three parts:—a rake, which is arranged at a certain distance above the ground and extends laterally in a horizontal plane; a saw-like knife which moves to and fro between the prongs of the rake in a direction transversely to that in which the machine is driven; and a bar arranged transversely at a certain distance above the rake and in front of the knife. All the stalks of corn which are caught by the prongs of the rake are bent down by the bar and prevented from coming in contact with the knife, until, gliding off from the bar, they spring back into their normal position and are forced against the knife which cuts them just beneath the heads of corn.

The drawing illustrates one example of carrying out the invention.

Figure 2:
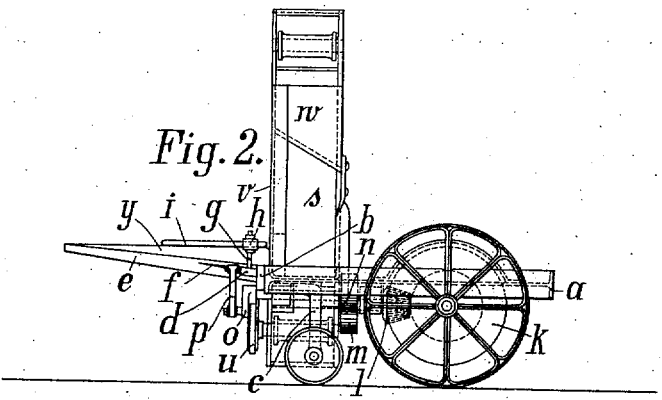
Figure 3:
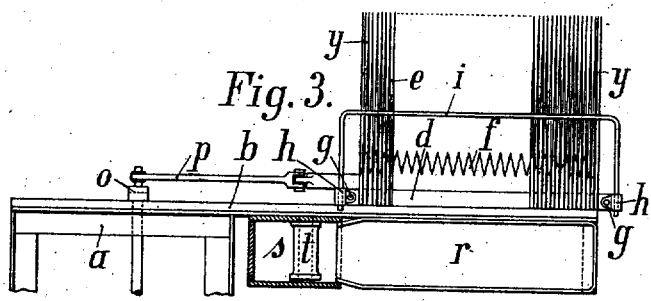
Figure 4:
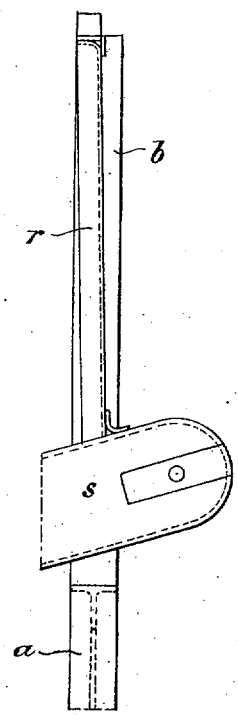

Figure 1 is a back view of the machine. Fig. 2 is a side view of the same, and Fig. 3 is a plan of the front part of the framework of the machine with the cutting device. Fig. 4 is a detail elevation of the trough.

The framework of the machine is composed of a rectangular frame $a$ of T-iron, the rear part of which is mounted on two ground wheels, and of a flat rail $b$ which is attached to the front leg of the frame. Arms $c$ on which is mounted a ground wheel, is attached both to the rail or bar $b$ and to the front leg of the frame. A projecting ledge $d$ to which the prongs of the rake are attached with their lower forked ends, extends over the right half of the bar $b$. The prongs of the rake are, as shown in Fig. 2, provided with slits which run from the projecting ledge $d$ and in which the knife $f$ moves. To the right and left of the rake $e$ there are fixed in the projecting ledge $d$ two vertical pegs $g$ which carry supports $h$ in which rests a bar $i$ which lies transversely above the rake $e$ and in front of the knife $f$, and whose position in relation to these two parts can be regulated as required.

A bevel wheel $k$, which engages with a smaller bevel wheel $l$ mounted upon a spindle attached to the frame $a$, is mounted upon the axle of the ground wheels. There is mounted moreover upon the same spindle as the bevel wheel $l$ a spur wheel $m$ which engages with a smaller spur wheel $n$ which is also mounted upon a spindle fixed to the frame $a$. A crank $o$, which is connected with the saw-like knife $f$ by means of a connecting rod $p$, is mounted upon the front end of this spindle which projects beyond the frame $a$. Behind the rail $b$ there is situated a groove $r$, and between this groove and the frame $a$ an elevator $s$. The shaft of the lower cylinder $t$ of the elevator is connected with the spindle upon which the wheels $l$ and $m$ are mounted by chain gear $u$. A vertical plate $o$ which adjoins the elevator and carries on its back a funnel $w$ is arranged on the front leg of the frame $a$. There are moreover provided on the front leg of the frame two lugs $x$ fixed in suitable apertures of the plate $o$ for receiving the pole.

When the machine is driven, the knife $f$ will be moved quickly to and fro in a direction which runs transversely to that of the machine by means of the wheels $k$ $l$ $m$ and $n$, the crank $o$ and the connecting rod $p$, while the endless band of the elevator $s$ to which cups are attached and which is not shown in the drawing, is actuated by means of the wheels $k$ and $l$ and the chain gear $u$.

When the machine is driven over a cornfield, the stalks of corn which pass between the prongs of the rake $e$ are forced downward by the bar $i$, and cannot come in contact with the knife $f$ until, the machine moving on, they are released by the bar $b$, springing back into their normal position, are thrown against the knife. It is now possible by altering the position of the supports $h$ and of the bar $i$ resting therein, so to regulate the position of this bar in relation to the rake and the knife, that the stalks of corn when released by the bar $i$ can only project with their heads above the rake, and must therefore, whether they were originally long or short, upright or bent, be severed in two by the knife just below the heads. The heads which have been cut off fall from the rake which is inclined somewhat toward the rear, into the groove $r$ which inclines to the left, and from thence into the elevator $s$ which lifts them up and throws them into the funnel $w$, from whence they pass into a basket or sack placed beneath it. Two pieces of sheet metal $g$ are arranged on both sides of the rake and prevent any corn from falling off it.

What we claim as our invention and desire to secure by Letters Patent is:—

1. A machine for cutting the heads of corn, provided with a rake $e$ arranged at a certain distance above the ground and extending laterally in a horizontal plane and having slots in its prongs, a saw-like knife $f$ which moves to and fro in said slots in a direction transversely to that in which the machine is driven and a bar $i$ arranged at a certain distance transversely above the rake $e$ and in front of the knife $f$, which bar bends the stalks of corn which pass between the prongs of the rake and prevents them from coming in contact with the knife until they are released by it and again assuming their normal position are thrown against the knife, which thereupon cuts them directly below the heads.

2. A machine for cutting the heads of corn, provided with a rake $e$ arranged at a certain distance above the ground and extending laterally in a horizontal plane and having slots in its prongs, a saw-like knife $f$ which moves to and fro in said slots in a direction transversely to that in which the machine is driven, and a bar $i$ arranged at a certain distance transversely above the rake $e$ and in front of the knife $f$, which bar bends the stalks of corn which pass between the prongs of the rake and prevents them from coming in contact with the knife until they are released by it and again assuming their normal position are thrown against the knife, which thereupon cuts them directly below the heads, and a trough lying behind the said rake and inclined downward away from the rake, which latter is also inclined downward toward the rear, and an elevator arranged in proximity to said trough and a funnel provided adjacent to said elevator, substantially as described.

In testimony whereof we have hereunto signed our names to this specification in the presence of two subscribing witnesses.

LUDWIG CHRIST.
ALOIS MEGNER.

Witnesses:
H. W. HARRIS,
JOS. H. LEUTE.